United States Patent
Braghiroli

(10) Patent No.: US 8,141,414 B2
(45) Date of Patent: Mar. 27, 2012

(54) APPARATUS FOR DETERMINING THE CONDITION OF A TIRE TREAD OF A VEHICLE WHEEL

(75) Inventor: Francesco Braghiroli, Reggio Emilia (IT)

(73) Assignee: Snap-On Equipment SRL a Unico Socio, Correggio (RE) (IT)

( * ) Notice: Subject to any disclaimer, the term of this patent is extended or adjusted under 35 U.S.C. 154(b) by 222 days.

(21) Appl. No.: 12/496,753

(22) Filed: Jul. 2, 2009

(65) Prior Publication Data

US 2010/0000310 A1    Jan. 7, 2010

(30) Foreign Application Priority Data

Jul. 3, 2008    (EP) ..................................... 08012038

(51) Int. Cl.
*G01M 17/02*    (2006.01)
(52) U.S. Cl. .......................................... 73/146; 340/442
(58) Field of Classification Search ........................ None
See application file for complete search history.

(56) References Cited

U.S. PATENT DOCUMENTS

| | | | |
|---|---|---|---|
| 4,089,226 A | | 5/1978 | Kraska et al. |
| 5,054,918 A | | 10/1991 | Downing et al. |
| 5,801,304 A | * | 9/1998 | Cantu et al. .................. 73/146 |
| 6,609,417 B1 | * | 8/2003 | Cantu et al. .................. 73/146 |
| 6,763,288 B2 | * | 7/2004 | Caretta et al. ..................... 701/1 |
| 7,051,584 B2 | * | 5/2006 | Robert et al. ................... 73/146 |
| 7,119,896 B2 | * | 10/2006 | Godeau et al. ............. 356/237.2 |
| 7,269,997 B2 | * | 9/2007 | Dale et al. ....................... 73/146 |
| 2005/0268707 A1 | | 12/2005 | Dale, Jr. et al. |

FOREIGN PATENT DOCUMENTS

| | | |
|---|---|---|
| CN | 1997870 A | 7/2007 |
| EP | 0 547 365 B1 | 6/1993 |
| JP | 10-157579 A | 6/1998 |
| JP | 2002-183260 A | 6/2002 |
| WO | WO 2005/121698 A1 | 12/2005 |

OTHER PUBLICATIONS

Chinese Office Action, w/ English translation thereof only, issued in Chinese Application No. 200910137466.5, dated Oct. 19, 2011.

* cited by examiner

*Primary Examiner* — Lisa Caputo
*Assistant Examiner* — Jermaine Jenkins
(74) *Attorney, Agent, or Firm* — McDermott Will & Emery LLP

(57) ABSTRACT

A method and apparatus for determining the condition of a tire tread of a vehicle wheel including a rim and a tire configured to perform the steps of:
(1) emitting an electromagnetic radiation towards the tread of the tire,
(2) receiving a reflected electromagnetic radiation from said tread of the tire in response to the emitted radiation,
(3) processing the reflected radiation to obtain height data including respective heights of a plurality of points located on the tread of the tire,
(4) repeating the steps (1) to (3) in successive time intervals within which the vehicle wheel has driven a predetermined distance, and storing the respective height data, particularly average values of the height data, each in dependence of the driven distance, and
(5) deriving from the succession of the stored height data a residual mileage of the tire.

16 Claims, 2 Drawing Sheets

APPARATUS FOR DETERMINING THE CONDITION OF A TIRE TREAD OF A VEHICLE WHEEL

Figure 1:
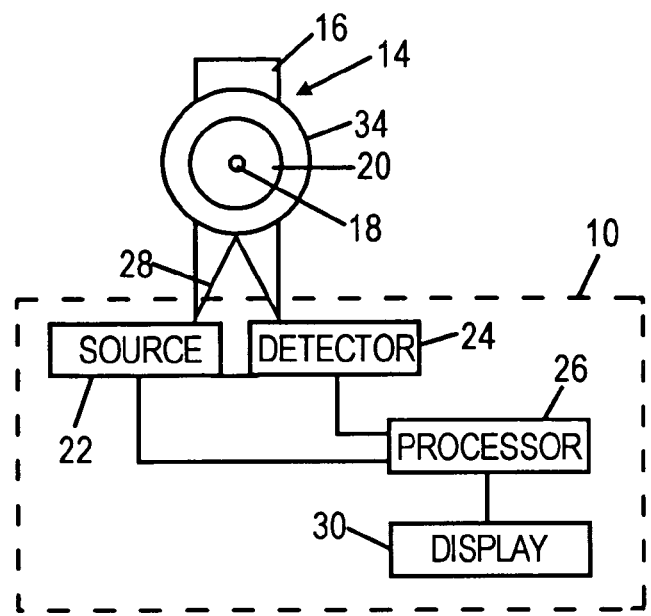

The present invention relates to a method and an apparatus for determining the condition of a tire tread of a vehicle wheel utilizing non-contact data collection and analysis of the collected data, and more specifically to an apparatus for obtaining data by non-contact measurement for the determination of the conditions of the tire.

A non-contact method and a system for analyzing tire conditions by directing radiation to the tire to be examined and sensing reflected radiation is, for example, disclosed in document U.S. Pat. No. 7,269,997 B2.

The object of the invention is to provide a method and an apparatus of the kind set forth in the opening part of this specification which provide a prediction of the residual mileage (durability) of the tire of the vehicle wheel.

According to the invention, the object is solved by the features of claim 1 or by the features of claim 10.

According to the present invention, an electromagnetic radiation, especially, light or a laser radiation is emitted towards the tire tread. At least one detector is provided for receiving radiation reflected from the tire tread in response to the emitted radiation. Electrical signals which represent the reflected radiation are fed to a data processing device, such as a computer for running a predetermined program, to determine conditions of the tire, especially its residual durability (lifetime, mileage). The data processing device obtains geometrical information, such as height or depth relative to a reference baseline, of a plurality of points on the wheel assembly based on the signals received from the at least one detector. The plurality of points may be located on the tire tread extending between the two sidewalls of the tire. Non-contact measurement concepts are known from U.S. Pat. No. 5,054,918 and U.S. Pat. No. 7,269,997 and can be used for carrying out the invention.

More specifically, the geometrical information about the shape of the surface or of a surface profile of at least a part of the tire tread is generated based on the height or depth information obtained by the non-contact measurement concept.

The scanning of the tire tread and the processing of the measured data to obtain the geometrical information about the tread condition is repeated in several time intervals, for example at the regular car check intervals or at regular tire check intervals, each after the tire has been driven a predetermined distance, for example 15.000 km. The distance can be shorter or longer, of course. The results of the measurements at each time interval were stored in the data processing device or in a separate data base which can be located in the tire shop or vehicle repair shop or at another appropriate location. Preferably, the data base is located at the vehicle repair shop which usually take care of the repair and maintenance of the automobile on a regular base. The obtained height or depth data are stored respectively in dependence of the driven distances.

The residual mileage (lifetime or durability) of the tire can be calculated from the current mileage (driven distance) of the tire and from the stored height data. The relationship between the tread wear and driven distance (mileage) is not linear. The most tires tend to wear more slowly as long as they are used. By storing the obtained results, the historical data demonstrating the tire wear are available for the determination of the tire condition. In order to identify the tire, respective identification data are stored together with the associated height data. Especially an RFID-system can be used to recover the respective data of the tire.

Regarding the determination of the condition of the tire, the measurement concept may include the measurement of one single circumferential portion or of several circumferential portions of the treaded surface of the tire and generating a surface profile showing respective heights or depths on the surface of the tire. For example, the surface of the tire can be scanned by rotating the vehicle wheel for at least one revolution. During the rotation, the emitter source continuously or intermittently emits radiations onto the tire tread and the at least one detector continuously or in a corresponding intermittent manner obtains (receives) reflected radiations from the tire tread and transmits respective electric signals to the data processing device. A surface profile showing the complete circumferential surface can be created by the data processing device. Further, the data processing device can calculate an average value of the measured heights or depths. The average value of the measured heights or depths of the tread profile along one or more circumferential portions of the tire tread represent the tread wear and can be stored for the determination of the residual mileage.

According to a particular aspect of the present invention, the height/depth information may be shown on a display means.

The present invention can be implemented into a wheel balancer apparatus or tire changer including a mounting means to which the vehicle wheel can rotatably mounted on a shaft.

Still other advantages of the invention will become readily apparent from the following detailed description, simply by way of illustration of the invention and not limitation. As will be realized, examples illustrated herein.

The accompanying drawings illustrate exemplary embodiments of the invention.

Figure 2:
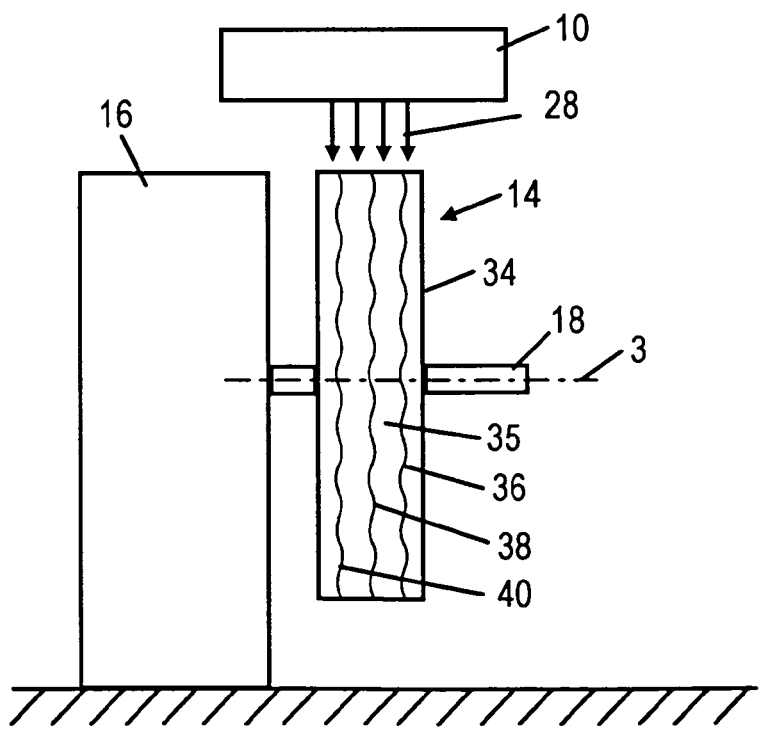
Figure 3:
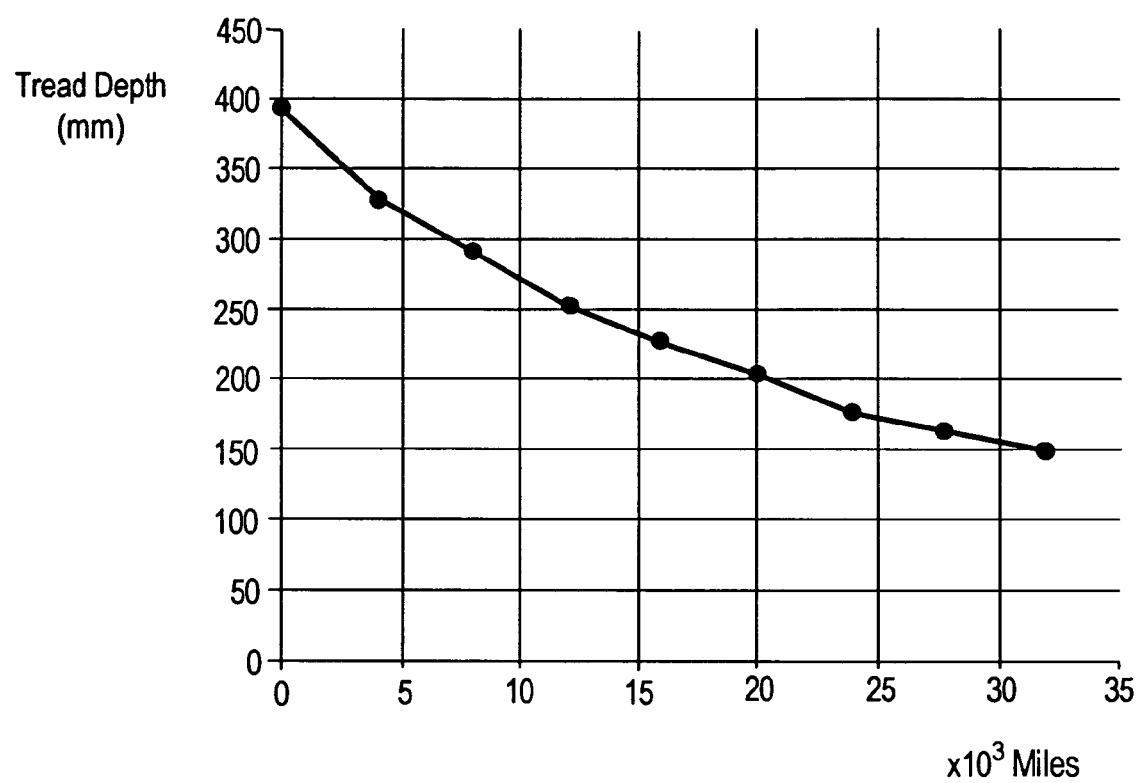

FIG. 1 shows an overall view of an exemplary non-contact analytic system for determining the condition of a tire tread, FIG. 2 depicts the implementation of the system shown in FIG. 1 into an apparatus having a shaft for a rotary support of the vehicle wheel, and FIG. 3 shows the relationship between tread wear and driven distances (mileage).

FIG. 1 refers to an embodiment of the present invention and show an exemplary apparatus 10 (non-contact analytic system) for determining the condition of a vehicle wheel 14, basically including a tire 34 and a rim 20, by analyzing a tread profile of the tire 34 including geometrical information, such as height and/or depth, related to various points on the tread of the tire 34.

FIG. 2 shows a tread surface 35 of the tire 34 of the vehicle wheel which is mounted rotary on a shaft 18 of an apparatus 16 which can be a wheel balancer or a tire changer. The tread surface 35 includes tread patterns 36, 38 and 40.

As is shown in FIGS. 1 and 2, the apparatus 10 for detecting the condition of a vehicle wheel 14 according to the present invention includes the apparatus 16 with the driven shaft 18 for the vehicle wheel 14 to be attached thereto, an emitter source 22, such as a laser which can emit a linear laser beam or a planar laser beam, LED light, or another appropriate light source, as well as at least one detector 24 such as cameras, a charged coupled device CCD or CMOS detectors, and a data processing device 26 such as a computer for running corresponding software to carry out the data evaluation of the detection signals of the at least one detector 24. Electromagnetic radiation is emitted towards the tread surface 25, such as laser illumination light and electric signals representing the radiation reflected by the tread surface 35 are produced by at least one detector 24 which picks-up the reflected radiation and the electric signals are transmitted to the data processing device 26 for obtaining height data or depth data for the tread profile along the circumferences of the tire. The shape and/or depth or tread patterns 36, 38, 40 of the tire 34 and output signals or data of an image representing the profile can be shown on a display 30.

The heights or depths of the tread profile can be measured along one circumferential tread portion, especially along a central circumferential tread portion, or along several circumferential tread portions.

Preferably, an average value of the measured heights or depths is calculated by the data processing device 26. The average value represents the tread wear. The measurements are repeated in given time intervals or after given driven distances, for example at the regular vehicle checks in a vehicle repair shop. Each measured tread wear value is stored and a plot like the one shown in FIG. 3 can be drafted or calculated by the data processing device 26. The data processing device 26 can include a data base in which the measured tread wear values are stored. From the plotted trend wear values the data processing device 26 calculates for example by curve fitting, intrapolation-extrapolation, the residual functionality or admitted residual usage (mileage) of the tire. By an ID-system for example a RFID-System the measured and stored values can be associated to the tire.

Further, it is possible to associate irregular tread wear patterns to defects on car components. For example, an one-side wear or feathering of the tread indicates to defects on the steering system or on the suspension system.

Based on the high accuracy of the measurement in the range of a tenth of mm an accurate depth map of the tire tread can be provided for the diagnosis. An early warning of a potential wearing of the tire can be achieved as well. When using a linear scanning beam (laser beam) a dotwise scanning of the tread surface is achieved along the circumferential portion of the tread surface 35. When using a planar laser beam the complete width of the tread surface 35 can be scanned during the rotation of the vehicle wheel 14.

The invention claimed is:

1. A method for determining the condition of a tire tread of a vehicle wheel including a rim and a tire comprising the steps of:
    (1) emitting an electromagnetic radiation towards the tread of the tire,
    (2) receiving a reflected electromagnetic radiation from said tread of the tire in response to the emitted radiation,
    (3) processing the reflected radiation to obtain height data including respective heights of a plurality of points located on the tread of the tire,
    (4) repeating the steps (1) to (3) in successive time intervals within which the vehicle wheel has driven a predetermined distance, and storing the respective height data, particularly average values of the height data, each in dependence of the driven distance, and
    (5) deriving from the succession of the stored height data a residual mileage of the tire.

2. The method according to claim 1, characterized in that the residual mileage is calculated from the current driven distance of the tire and the stored height data.

3. The method according to claim 1 or 2, characterized in that the residual mileage is calculated by at least one of the following steps: curve fitting, interpolation-extrapolation on the base of the stored data.

4. The method according to claim 1 or 2, characterized in that the height data are stored in a database, wherein the stored height data are associated to identification data of the respective tire.

5. The method according to claim 1 or 2, characterized in that the height data are further processed to determine any irregular tread wear pattern.

6. The method according to claim 1 or 2, characterized in that the height data were obtained in connection with a wheel balancing operation or a tire changing operation.

7. The method according to claim 1 or 2, characterized in that at least one circumferential portion of the surface of the tire tread is scanned by the emitted radiation.

8. The method according to claim 1 or 2, characterized in that the tire tread is scanned while the vehicle wheel is rotated.

9. The method according to claim 1 or 2, characterized in that the height data are associated to respective rotary angles and positions along the width of the tire tread.

10. An apparatus for determining the condition of a tire tread of a vehicle wheel which includes a rim and a tire, the apparatus comprising:
    an emitter source for emitting radiation electromagnetic towards the tire tread,
    at least one detector for receiving radiation reflected from said wheel assembly in response to the emitted radiation,
    a data processing device connected to said emitter source and said at least one detector for processing data, wherein said data processing device is configured to perform the steps of:
    obtaining height data including respective heights of a plurality of points located on the surface of the wheel assembly based on the reflected radiation received from the at least one detector,
    storing the height data, particularly an average value of the height data, successively obtained in time intervals within which the vehicle wheel has driven a predetermined distance; and
    deriving from the succession of the stored height data a residual mileage of the tire.

11. Apparatus according to claim 10, wherein said data processing device is configured to obtain along at least one circumferential portion of the tread a height data.

12. Apparatus according to claim 11, wherein said surface profile covers the complete surface of the tire tread is scanned.

13. Apparatus according to any one of the claims 10 to 12, wherein said data processing device is adapted for obtaining height information by scanning the tread surface while said wheel assembly is rotated by at least one revolution.

14. Apparatus according to any one of the claims 10 to 12, wherein the emitted electromagnetic radiation is a laser radiation.

15. Apparatus according to any one of the claims 10 to 12, wherein the emitter source is configured to emit the radiation in form of a linear beam or in the form of a planar beam.

16. Apparatus according to any one of the claims 10 to 12, adapted to be implemented into a wheel balancer or into a tire changer.

* * * * *